United States Patent
Chiang et al.

(10) Patent No.: US 7,379,055 B2
(45) Date of Patent: May 27, 2008

(54) DATA RECORD METHOD USING A TOUCH PANEL

(75) Inventors: Chi-Jui Chiang, Taipei (TW); Ya-Li Chou, Taipei (TW); Chin-Mu Hsiao, Taipei (TW)

(73) Assignee: Tatung Co., Ltd., Taipei (TW)

( * ) Notice: Subject to any disclaimer, the term of this patent is extended or adjusted under 35 U.S.C. 154(b) by 778 days.

(21) Appl. No.: 10/997,852

(22) Filed: Nov. 29, 2004

(65) Prior Publication Data

US 2005/0116939 A1    Jun. 2, 2005

(30) Foreign Application Priority Data

Dec. 1, 2003    (TW) ............................... 92133710 A

(51) Int. Cl.
*G09G 5/00*    (2006.01)

(52) U.S. Cl. ..................... 345/173; 345/156; 345/168; 345/169; 345/501; 345/530

(58) Field of Classification Search ................ 345/156, 345/168, 169, 173, 501, 530
See application file for complete search history.

(56) References Cited

U.S. PATENT DOCUMENTS

| | | | |
|---|---|---|---|
| 5,347,275 A * | 9/1994 | Lau ............................. | 341/20 |
| 6,219,037 B1 * | 4/2001 | Lee ............................. | 345/167 |
| 6,630,928 B1 * | 10/2003 | McIntyre et al. ........... | 345/173 |
| 7,253,808 B2 * | 8/2007 | Hong ......................... | 345/173 |
| 2002/0022499 A1 * | 2/2002 | Newman et al. ............ | 455/556 |
| 2002/0135651 A1 * | 9/2002 | Spurgeon et al. ........... | 347/100 |
| 2003/0198008 A1 * | 10/2003 | Leapman et al. ........... | 361/681 |
| 2004/0140958 A1 * | 7/2004 | Tsai et al. ................... | 345/173 |

* cited by examiner

*Primary Examiner*—Bipin Shalwala
*Assistant Examiner*—Vince E Kovalick
(74) *Attorney, Agent, or Firm*—Bacon & Thomas, PLLC

(57) ABSTRACT

A data record method using a touch panel is disclosed. The touch panel can be separated from a computer. The computer and the touch panel store data having plural records respectively. The method includes the steps: (A) determining if the touch panel is connected with the computer at work; (B) executing a synchronization procedure for data synchronization between the computer and the touch panel when connecting; and (C) displaying data stored in the touch panel when not connecting.

6 Claims, 2 Drawing Sheets

DATA RECORD METHOD USING A TOUCH PANEL

BACKGROUND OF THE INVENTION

1. Field of the Invention

The present invention relates to a data record method using a touch panel and, more particularly, to a data record method for keeping data synchronization between a touch panel and a computer.

2. Description of Related Art

Currently, notebooks and table PCs increasingly become necessary in human living. Every one almost has a notebook or computer to work and store data. Computers accordingly play an important role in living, for example, storing important information including a calendar, an address book, and the like. Using computer makes human living easy but it is still not convenient in somewhere. For example, when a person suddenly needs to refer his or her address book or calendar, he or she has to power on a computer and wastes time on waiting for computer booting or re-booting, especially when data inquiry time is less than booting.

Therefore, it is desirable to provide an improved method to mitigate and/or obviate the aforementioned problems.

SUMMARY OF THE INVENTION

The object of the invention is to provide a data record method using a touch panel, which can provide a person to refer data, such as an address book, a calendar and the like, separately using the touch panel without powering on any computer to thus save boot time. In addition, the touch panel has features of small size, easy to carry out and so on, which can provide a person with high convenience and mobility of data inquiry and high space utility.

To achieve the object, a data record method using a touch panel is provided. The touch panel is separated from and connected with a computer. The computer and the touch panel store data having plural records respectively. The method includes the steps: (A) determining if the touch panel is connected with the computer at work; (B) determining if data in the touch panel and the computer is identical; (C) executing a synchronization procedure to synchronize data when the computer and the touch panel are connected and have different data; and (D) displaying the plural records stored in the touch panel when the computer and the touch panel are not connected and have identical data.

The inventive method can use multiple touch panels, not limit to a single touch panel, and is suitable for other portable devices such as Smart Phone capable of connecting to a computer to keep data synchronization.

Other objects, advantages, and novel features of the invention will become more apparent from the following detailed description when taken in conjunction with the accompanying drawings.

DETAILED DESCRIPTION OF THE PREFERRED EMBODIMENT

To better understanding, a preferred embodiment is given in the following.

The inventive data record method uses a touch panel with an embedded system to execute applications. Every application stores respective data. For example, the contents of address book, calendar, perpetual calendar and the like can be stored in the Outlook application, so that a user can directly inquire the contents in the touch panel without computer power-on and thus saving the booting time.

Figure 1:
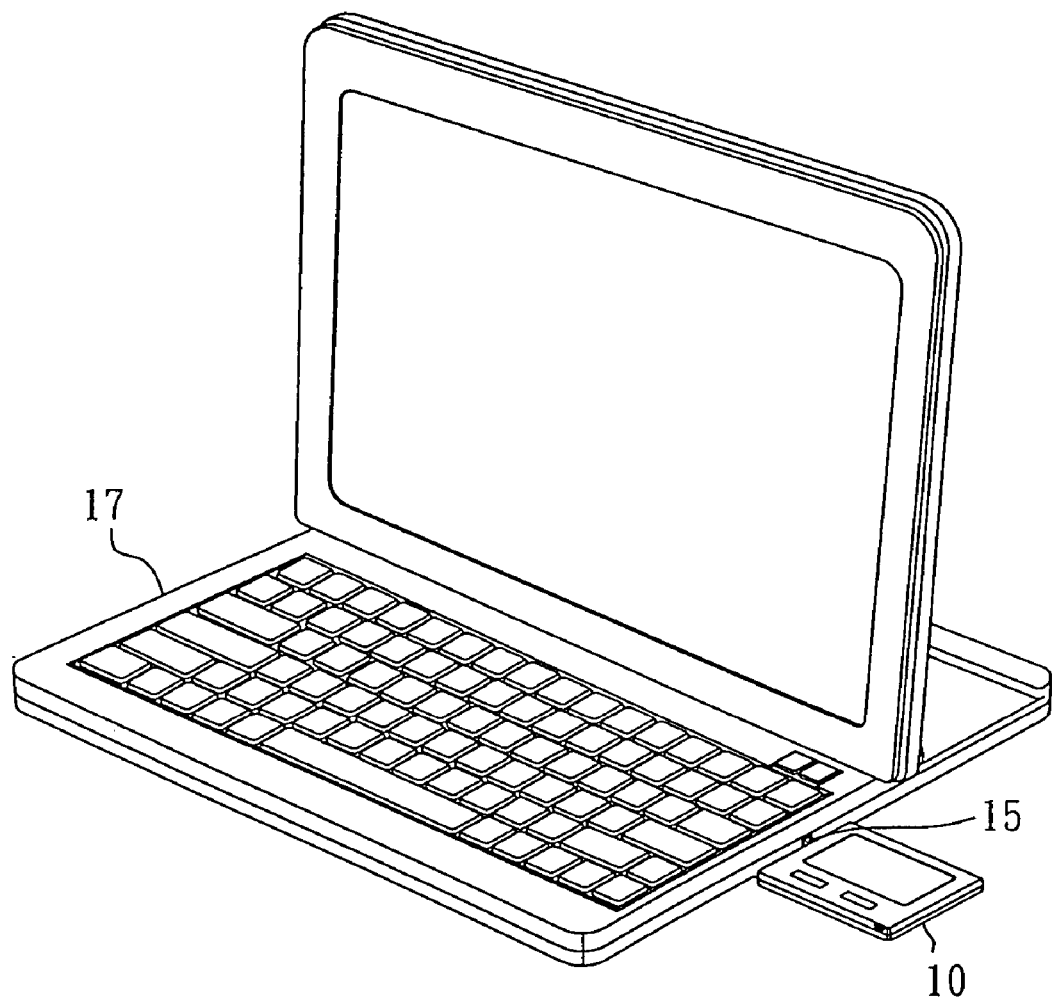
FIG. 1 is a schematic view of an embodiment according to the invention.

FIG. 1 is a schematic view of an embodiment according to the invention. In FIG. 1, the embodiment includes a touch panel 10 and a computer 17. As shown in FIG. 1, the touch panel 10 has a connection port 15 to connect to the computer 17. The computer 17 can be a notebook, a table PC or a desktop. The connection port 15 can be a USB device to provide the touch panel 10 with a USB interface so that the touch panel 10 can connect with the computer 17 easy. The touch panel 10 internally stores various data such as address book, calendar, perpetual calendar and the like. When a user performs add, update and delete operations on data contents stored in the Outlook, data contents stored in the touch panel can concurrently be updated through the USB interface, so that the user can directly inquire data contents of address book, calendar, perpetual calendar and the like through the touch panel.

Figure 2:
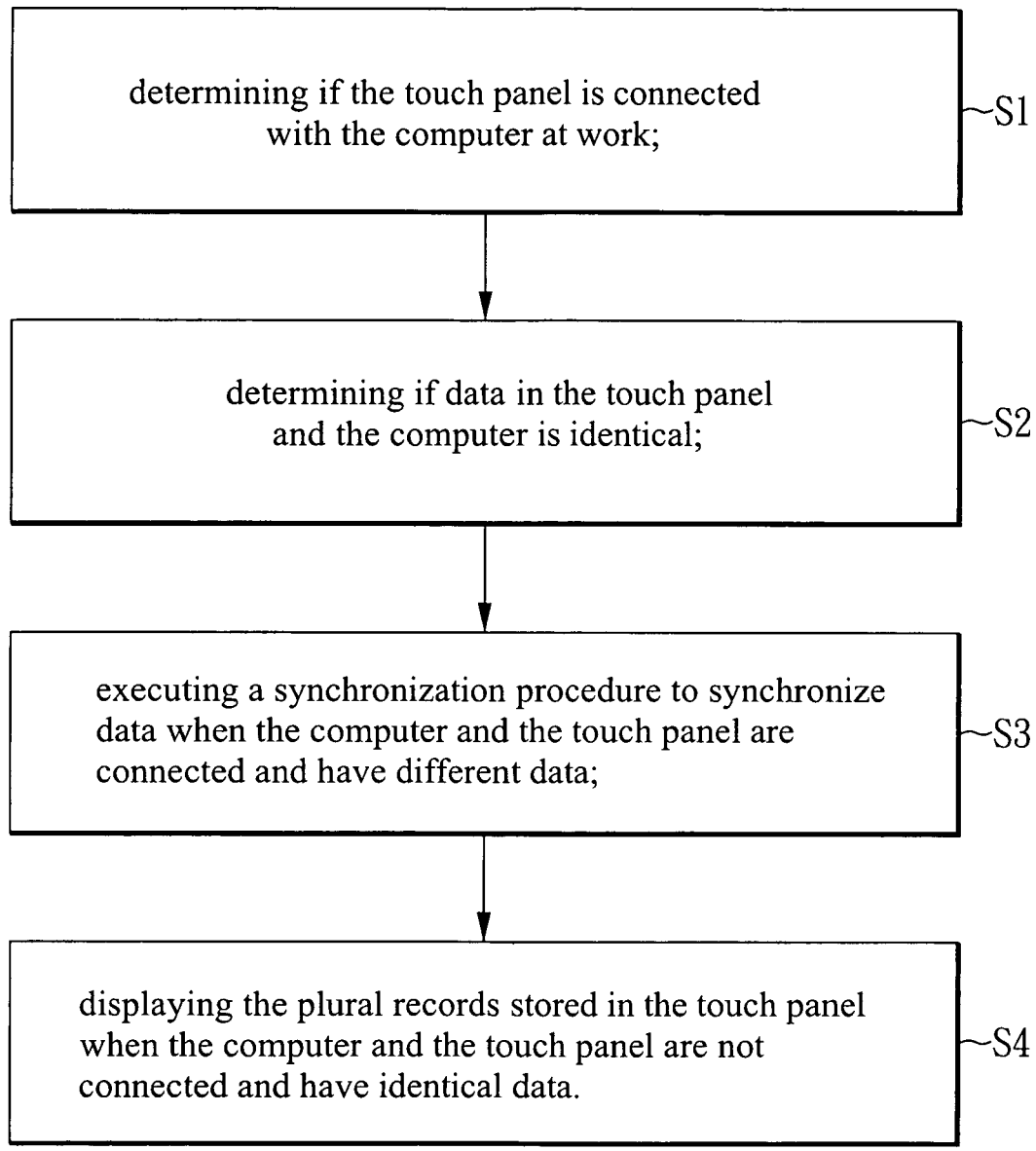
FIG. 2 is a flowchart of a data fetch method according to the invention.

FIG. 2 is a flowchart of a data fetch method according to the invention. As shown in FIG. 2, the method includes the steps: determining if the touch panel 10 is connected with the computer 17 at work (step S1). If not, the touch panel 10 cannot perform data update through the computer 17 but work alone. At this point, a user can directly performs data inquiry on the touch panel 10 in separate from or mounting on the computer 17 and accordingly the touch panel 10 displays the plural records stored (step S4).

On the other hand, when the touch panel 10 is connected with the computer 17 at work, because both data may not be identical, step S2 has to further determine if the data is identical, which can be achieved by comparing data one-to-one or data update time. As the comparison result is not identical, step S2 further executes a synchronization procedure on the touch panel 10 for using data either in the computer 17 or in the touch panel 10 to update the other. Thus, both data can be synchronized. After the data synchronization is complete and thus the data is updated, a user can inquire correct data through the touch panel 10 (step S4), no matter that the touch computer and the touch panel separated or connected.

As cited, the inventive method can keep data identical in the touch panel and the computer and use the touch panel to inquire data, no matter that the touch panel and the computer are separated or connected. Thus, the data can be inquired correct and convenient.

Although the present invention has been explained in relation to its preferred embodiment, it is to be understood that many other possible modifications and variations can be made without departing from the spirit and scope of the invention as hereinafter claimed.

What is claimed is:

1. A data record method using a touch panel, the touch panel capable of separating from and connecting with a computer, the computer and the touch panel storing data having plural records respectively, the method comprising the steps:

(A) determining if the touch panel is connected with the computer at work;
(B) determining if data in both the touch panel and the computer is identical;
(C) executing a synchronization procedure to synchronize data when the computer and the touch panel are connected and have different data; and
(D) displaying the plural records stored in the touch panel when the computer and the touch panel are not connected and have identical data.

2. The method as claimed in claim 1, wherein the touch panel is independent to display the plural records.

3. The method as claimed in claim 1, wherein the synchronization procedure applies data stored in the computer or the touch panel to update the other.

4. The method as claimed in claim 1, wherein the data is an address book.

5. The method as claimed in claim 1, wherein the data is a calendar.

6. The method as claimed in claim 1, wherein the data is a perpetual calendar.

* * * * *